No. 704,754. Patented July 15, 1902.
J. MOHS.
MACHINE FOR MOLDING BRICKS.
(Application filed May 7, 1901.)
(No Model.) 4 Sheets—Sheet 1.
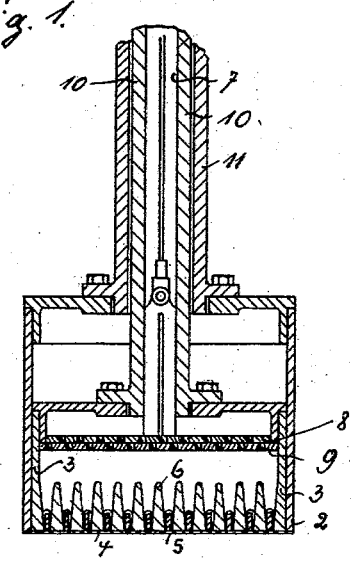
Fig. 1.
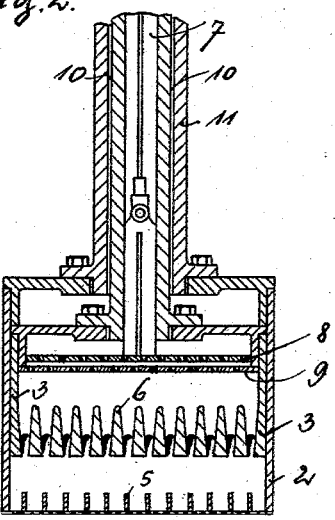
Fig. 2.
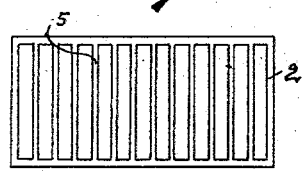
Fig. 3.
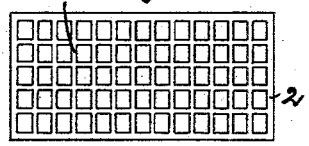
Fig. 4.
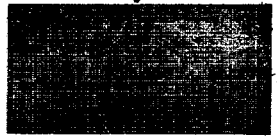
Fig. 5.
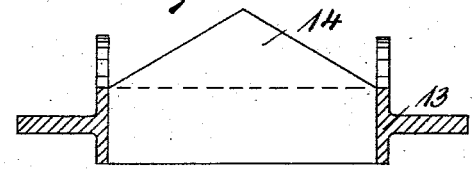
Fig. 8.
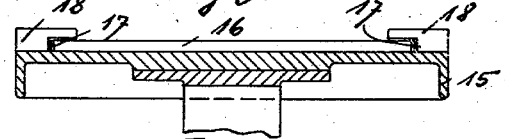
Fig. 9.
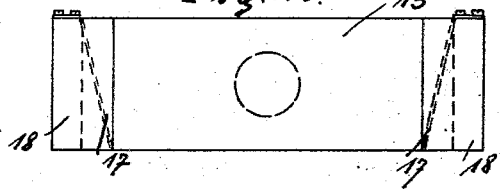
Fig. 10.
Fig. 6.
Fig. 7.
Witnesses:
Arthur Scholz
Walter Niemet
Inventor:
Julius Mohs
by Robert Heishel
Attorney

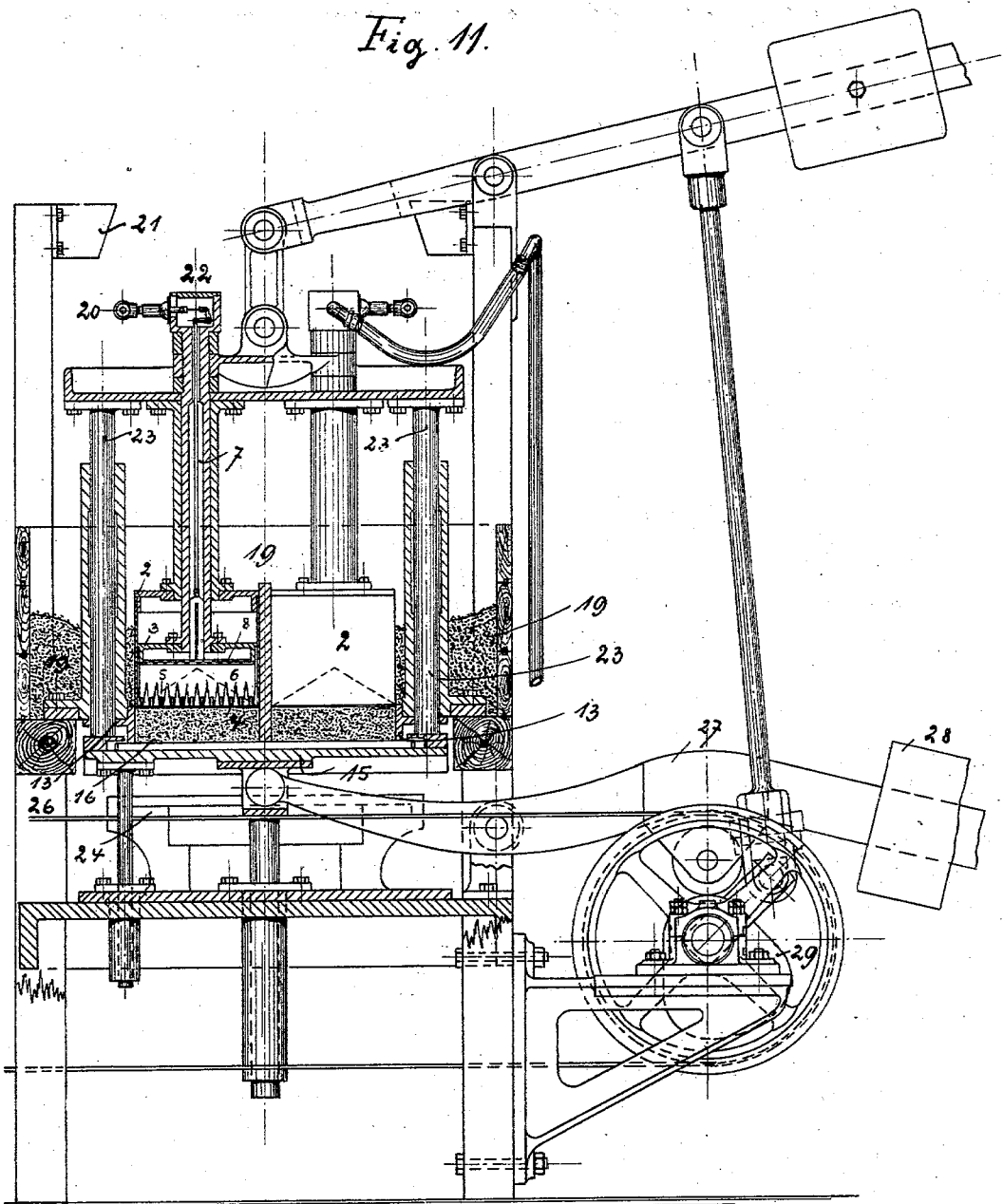

No. 704,754. Patented July 15, 1902.
J. MOHS.
MACHINE FOR MOLDING BRICKS.
(Application filed May 7, 1901.)
(No Model.) 4 Sheets—Sheet 3.

Witnesses:
Arthur Scholz
Walter Niemet

Inventor:
Julius Mohs
by Robert Keifer
Attorneys

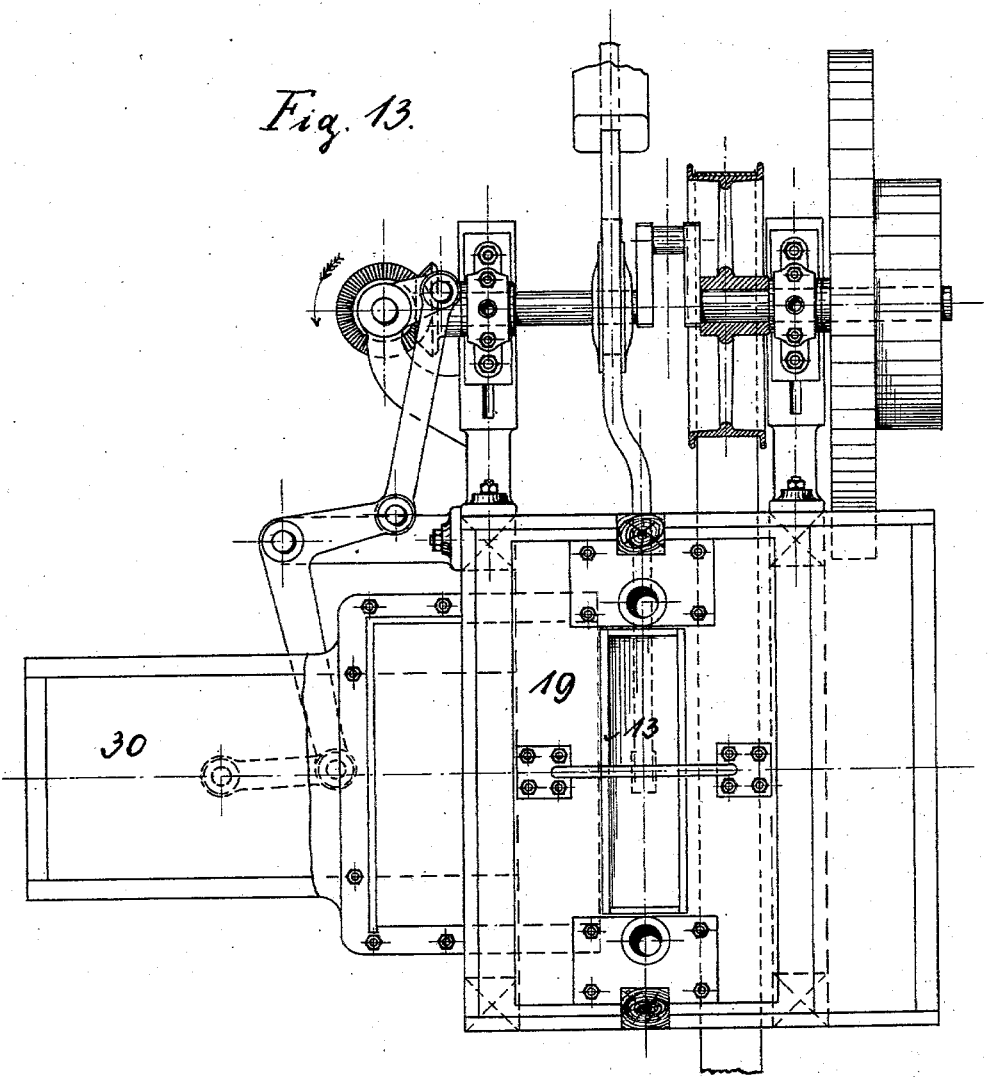

UNITED STATES PATENT OFFICE.

JULIUS MOHS, OF BRANDENBURG, GERMANY.

MACHINE FOR MOLDING BRICKS.

SPECIFICATION forming part of Letters Patent No. 704,754, dated July 15, 1902.

Application filed May 7, 1901. Serial No. 59,191. (No model.)

*To all whom it may concern:*

Be it known that I, JULIUS MOHS, a subject of the King of Prussia, German Emperor, and a resident of 25 Jacobstrasse, Brandenburg-on-the-Havel, Kingdom of Prussia, German Empire, have invented certain new and useful Improvements in Machines for Molding Bricks, of which the following is an exact specification.

My invention relates to that class of brick-molding machines in which the clay or other material is brought by means of a plunger into a mold; and the objects of my improvements are, first, to provide a plunger by means of which the bricks can be discharged without the clay or other material sticking to the same, and, secondly, to provide a device by means of which the bricks are automatically brought to the drying-sheds. I attain these objects by the mechanism illustrated in the accompanying drawings, in which—

Figure 1 is a vertical section of the plunger to be used. Fig. 2 is a vertical section of the same in another position. Figs. 3 to 7 are detail views of parts of the same in several modified constructions. Fig. 8 is a vertical section of the mold. Figs. 9 and 10 illustrate the construction of the molding-table. Fig. 11 is a vertical section of the whole machine. Fig. 12 is a vertical section of the same at right angles to that shown in Fig. 11. Fig. 13 is an upper view of the machine.

In brick-molding machines in which the clay or other material is brought into a mold by means of a plunger it is always a great disadvantage that the clay or the like usually sticks to the plunger, so that it is not possible to use this plunger for pushing the brick after the molding out of the mold. In order to avoid this sticking of the clay to the plunger, I provide the plunger with a webbing 4, supported by ribs 5, Figs. 1, 2, and 11. By means of the arrangement of this webbing 4 it is attained that air as well as water can be led to the lower surface of the plunger 2, whereby the material is loosened from this surface and the bricks can be discharged immediately from the mold upon drying-boards without their sticking to the plunger.

The water and the air can be led to the webbing on the lower surface of the plunger 2 in different ways. In the construction shown in the drawings a second plunger 3 is provided within the plunger 2. This plunger 3 consists also of a frame provided with ribs 6, which ribs fit between the ribs 5 of the plunger 2, as may be seen from Fig. 1 of the drawings. In the position shown in this figure the ribs 6 are situated between the ribs 5, so that behind the webbing a flat surface is formed, whereby the entrance of clay into the interior of the plunger is perfectly avoided. In this position the plunger serves for pressing the clay into the mold. Now in order to lead air to the webbing 4 in order to avoid the clay sticking to the same, the plunger 3 is raised, as shown in Fig. 2. By further raising the plunger 3 two perforated plates 8 and 9, the perforations of which are situated in that way that in case the plunger is in the position shown in Fig. 1 all perforations are closed, are separated from each other, so that water, steam, or the like contained in the pipe 7, leading into the interior of this plunger 3, can stream through the perforations of the plates 8 and 9 and through the space between the ribs 6 and the ribs 5 to the webbing 4.

Figs. 3 and 4 show different constructions of ribs 5, provided behind the webbing 4. (Shown in Fig. 5.)

Fig. 6 is a vertical section of a double plunger—that is to say, a plunger for molding two bricks at a time. In this construction one of the ribs 5 projects over the lower surface of the plunger at 12.

Fig. 7 is a lower view of the construction shown in Fig. 6. In this view it is shown that the webbing 4 may just as well be replaced by parallel wires.

Figure 12:
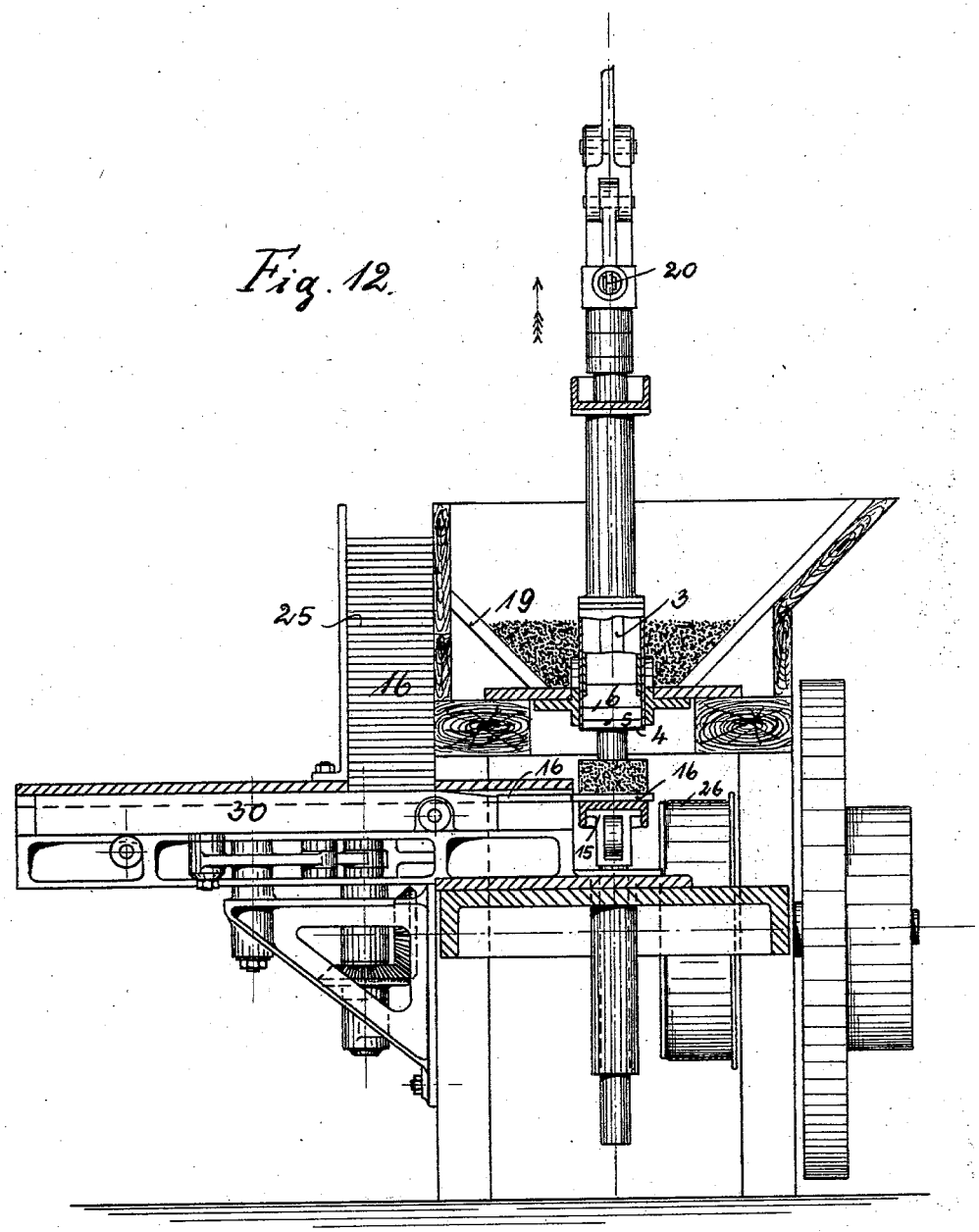

The mold to be used is shown in Fig. 8. It consists of a frame 13, the upper edges of which are triangle-formed. This has the purpose of avoiding small stones or the like contained in the clay from damaging the edges of the mold or of the plunger. By the beveled surface of these edges stones or the like will glide down along these beveled edges. The molding-table, the construction of which is shown in Figs. 9 and 10, consists of a plate 15, provided with slide-rails 18, adapted to hold the boards for taking up the bricks in their centric position. As these boards are always pushed off by the succeeding ones, it might easily happen that they are pushed too far on account of the living force of the same. In order to avoid this, sliding springs 17 are provided for holding these boards back.

The effect of the machine is as follows: The clay is brought into the hopper 19, in which one or several plungers, as described above, are provided. When these plungers are raised, the clay enters into the molds 13. By the raising of the plunger the webbing 4, forming the lower surface of the same, is washed with water. The washing is effected, as described above, by the perforated plate 8 being raised. The raising of this plate is effected by means of a lever arrangement 22, Fig. 11. This lever arrangement is operated by means of a roller 20, which in raising the plunger is pressed against the beveled surface 21, so that this roller is pressed back, whereby the plate 8 is raised. The water standing in the pipe 7 can flow hereafter through the perforations of the plates 8 and 9 to the webbing 4. Hereafter the plunger is lowered again until it touches the upper edge of the mold 13. In this position the molding-table, upon which, as described above, a board is situated, begins to move downward. The movement of this molding-table is effected either by the bars 23, which serve for leading the whole upper part of the machine, to which the plungers are fixed, touching the molding-table 15 and shifting the same downward, or in case of plungers and molds being used in which two or more bricks are molded at a time, as in Figs. 6 and 7, by the projecting ribs for separating the different molds touching the boards situated upon the molding-table, and thereby shifting the same downward. By the further downward motion of the plunger 2 the brick contained in the mold is pushed through the frame 13 and herewith discharged from the mold. As soon as the whole brick has left the frame 13 the plunger begins to rise. The board upon which the brick so formed is situated is now pushed off automatically by the succeeding board and brought upon a traveling cloth, leading it to the drying-sheds. Hereafter the molding-table is raised until it touches the lower edge of the frame 13. Now the plunger is raised and the operation described above takes place again. The boards 16 for taking up the bricks are situated in a magazine 25, Fig. 12. The lowest of these boards is shifted forward by means of a slide 30 going forward and backward. The way which these boards have to pass leads them over the molding-table 15 and goes from there to the traveling cloth 26. The shifting forward of the boards is always effected at the moment when the readily-molded brick is situated upon the molding-table.

The upward-and-downward motion of the molding-table 15 can be effected in different ways. In the construction shown in Fig. 11 this table is pressed against the mold 13 by means of a lever 27, provided with a weight 28, and is lowered to the level in which the traveling cloth is situated by means of a cam 29. In this latter position, which is shown in Fig. 12, the slide 30 shifts the boards 16 forward, thereby shifting the board, with the brick molded upon it, upon the traveling cloth 26 and bringing the following one upon the molding-table 15. Hereafter this molding-table is raised by the weight 28 until the board touches the lower edge of the frame 13, whereafter the mold is filled again with clay and the plunger begins to go downward and to push the material contained in the mold 13 downward. As soon as the board 16, with the brick situated upon it, is pushed downward, so that the brick has perfectly left the frame 13, the molding-table 15 is still further lowered by means of the cam 29 until it is at the same level again with the traveling cloth 26. In this position the following board shifts the boards forward upon the traveling cloth, whereafter the molding-table is raised and the same operation begins again.

Having thus fully described the nature of my invention, what I desire to secure by Letters Patent of the United States is—

1. In machines for molding bricks, the combination of a mold with a plunger, a webbing situated on the lower surface of said plunger, a frame provided with several ribs situated behind said webbing, a second plunger arranged within the first one also provided with several ribs, said ribs being adapted to fit between the ribs of the first plunger, as and for the purpose set forth.

2. In machines for molding bricks, the combination of a mold with a plunger, a webbing situated on the lower surface of said plunger, a frame provided with several ribs situated behind said webbing, a second plunger arranged within the first one also provided with several ribs, said ribs being adapted to fit between the ribs of the first plunger, and means for leading air and water to the webbing, as and for the purpose set forth.

3. In machines for molding bricks, the combination of a mold with a plunger, a webbing situated on the lower surface of said plunger, a frame provided with several ribs situated behind said webbing, a second plunger arranged within the first one also provided with several ribs, said ribs being adapted to fit between the ribs of the first plunger, and means for leading air and water to the webbing, said means consisting of two plates provided with perforations, as and for the purpose set forth.

4. In machines for molding bricks, the combination of a mold and a plunger for discharging the bricks from said mold with a molding-table movable upward and downward, said molding-table being provided with slide-rails for taking up the brick-boards, and with sliding springs for preventing the boards from being pushed too far, slides for pushing the brick-boards forward and transmitting the same to a traveling cloth and a traveling
5 cloth for transmitting the bricks to the drying-sheds, as and for the purpose set forth.

In testimony whereof I have signed my name to this specification in the presence of two subscribing witnesses.

JULIUS MOHS.

Witnesses:
HENRY HASPER,
WOLDEMAR HAUPT.